United States Patent
Fries et al.

(10) Patent No.: US 6,913,633 B2
(45) Date of Patent: Jul. 5, 2005

(54) POLYCRYSTALLINE ABRASIVE GRIT

(76) Inventors: Robert Fries, 4 Birnam Road, Forest Town, 2193, Johannesburg (ZA); Iakovos Sigalas, 112 Third Street, Linden, 2195 (ZA); Manfred Nebelung, 4 Prellerstrasse, Dresden (DE)

( * ) Notice: Subject to any disclaimer, the term of this patent is extended or adjusted under 35 U.S.C. 154(b) by 0 days.

(21) Appl. No.: 10/398,655

(22) PCT Filed: Oct. 9, 2001

(86) PCT No.: PCT/IB01/01875
§ 371 (c)(1),
(2), (4) Date: Oct. 29, 2003

(87) PCT Pub. No.: WO02/31078
PCT Pub. Date: Apr. 18, 2002

(65) Prior Publication Data
US 2004/0060243 A1 Apr. 1, 2004

(30) Foreign Application Priority Data
Oct. 12, 2000 (ZA) .............................................. 00/5624

(51) Int. Cl.⁷ .......................... C09K 3/14; B24D 18/00; B01J 3/06
(52) U.S. Cl. ............................. 51/307; 51/309; 51/298; 51/293
(58) Field of Search ........................ 51/293, 307, 298, 51/309; 423/446

(56) References Cited

U.S. PATENT DOCUMENTS

| 4,224,380 A | 9/1980 | Bovenkerk et al. |
| 4,505,746 A | 3/1985 | Nakai et al. |
| 5,980,982 A * | 11/1999 | Degawa et al. ............. 427/185 |
| 2004/0076748 A1 * | 4/2004 | Fries et al. ................. 427/212 |

FOREIGN PATENT DOCUMENTS

EP   0 012 631   6/1980

* cited by examiner

*Primary Examiner*—Michael Marcheschi
(74) *Attorney, Agent, or Firm*—Oblon, Spivak, McClelland, Maier & Neustadt, P.C.

(57) ABSTRACT

A method is provided for producing a plurality of polycrystalline ultra-hard abrasive grit. The method includes the steps of providing a mass of ultra-hard abrasive particles or a mass of a combination of a precursor for such particles and a suitable solvent/catalyst, forming the mass into a plurality of green state granules, placing the granules with a separating medium between adjacent granules in the reaction zone of a high pressure/high temperature apparatus, subjecting the contents of the reaction zone to elevated temperature and pressure conditions which the ultra-hard abrasive particle is crystallographically stable, recovering the thus sintered material from the reaction zone and removing the separating medium in the sintered material to produce a plurality of crystalline abrasive grit. The ultra-hard abrasive is generally diamond or cubic boron nitride.

23 Claims, No Drawings

POLYCRYSTALLINE ABRASIVE GRIT

BACKGROUND OF THE INVENTION

This invention relates to polycrystalline abrasive grit.

Ultra-hard abrasive bodies in the form of either abrasive compacts or individual crystals are well known in the art. The abrasive compact will generally be a diamond compact, also known as polycrystalline diamond or PCD, or a cubic boron nitride compact, also known as polycrystalline cubic boron nitride or PCBN. These abrasive compacts have wide application in cutting, drilling, boring, milling and other abrasive applications.

Such ultra-hard abrasive bodies are produced under conditions of elevated temperature and pressure at which the ultra-hard abrasive is crystallographically stable. Polycrystalline diamond or polycrystalline boron nitride can be produced with or without a second phase or bonding matrix. The second phase, when provided, may be in the case of diamond a solvent/catalyst such as cobalt, or it may be a carbide-forming element such as silicon. Similar sintering mechanisms are utilised in PCBN synthesis with various carbides, nitrides and borides being common second phases.

Abrasive compacts are generally produced in the form of a disc, either free-standing or bonded to a support, which may be cut into smaller segments for use.

Single crystal ultra-hard abrasives in the form of either diamond or cubic boron nitride crystals, also referred to as "grit", are used in loose or bonded form for a variety of abrasive applications such as lapping, drilling, grinding and sawing.

Examples of abrasive tools which utilise single crystal ultra-hard abrasives are grinding wheels and saw segments. Bond types for such abrasives can be a metal, resin or a ceramic.

Diamond or CBN grits are typically produced through a high pressure/high temperature process where graphite or hexagonal boron nitride is converted in the presence of a suitable catalyst to, respectively, diamond or cubic boron nitride. In some cases natural diamond crystals are also employed.

The concepts of abrasive compacts and grits have been combined and have led to the development of polycrystalline grit. For instance U.S. Pat. No. 4,776,861 describes a process for generating polycrystalline grit containing ultra-hard material. This is achieved by leaching non-diamond material from polycrystalline diamond or cubic boron nitride compacts obtained through a high pressure/high temperature process and subsequently crushing the leached product.

The process of high pressure/high temperature sintering followed by subsequent crushing is not ideal as a high amount of energy is consumed in crushing sintered PCD and control over the shape and size of the final product is limited. Hence yield and quality tend to be low.

SUMMARY OF THE INVENTION

According to the present invention, a method of producing a plurality of polycrystalline ultra-hard abrasive grit includes the steps of providing a mass of ultra-hard abrasive particles or a mass of a combination of a precursor for such particles and a suitable solvent/catalyst, forming the mass into a plurality of green state granules, placing the granules with a separating medium between adjacent granules in the reaction zone of a high pressure/high temperature apparatus, subjecting the contents of the reaction zone to elevated temperature and pressure conditions at which the ultra-hard abrasive particle is crystallographically stable, recovering the thus sintered material from the reaction zone and removing the separating medium in the sintered material to produce a plurality of polycrystalline abrasive grit.

The method of the invention involves, as a first step, the forming of the mass of ultra-hard abrasive particles or of combination of a precursor for such particles and solvent/catalyst into a plurality of green state granules. The term "green state granules" means a coherent mass of any suitable shape or size and which is produced, for example, by known granulation or pelletising techniques.

The green state granules will generally be produced in the presence of a second (or binder) phase. The second phase may be provided by a material which participates in or contributes to the formation of the polycrystalline ultra-hard abrasive grit, e.g. a solvent/catalyst for the ultra-hard abrasive. The second phase may also be a binder, organic or inorganic, which may be removed prior to subjecting the granules to the high temperature/high pressure sintering conditions. The second phase can also consist of a combination of these two second phases.

If a precursor for the ultra-hard abrasive is used, then a solvent/catalyst for that ultra-hard abrasive must also be present. Examples of suitable solvent/catalysts for such particles, particularly when the particles are diamond or cubic boron nitride, are well known in the art. The solvent/catalysts may be precursors which can be converted to the solvent/catalyst, e.g. metal oxides which on heating are converted to the metal. Such precursors are included in the term "solvent/catalyst".

Examples of combinations, generally in the form of mixtures, of ultra-hard abrasive particles or precursor particles and second phases which are useful in the practice of the invention are:

1. Diamond and a diamond solvent/catalyst which may be a transition metal such as cobalt, nickel, iron or manganese or non-metallic solvent/catalyst such as a carbonate or sulphate to produce a sintered, intergrown polycrystalline diamond grit material.
2. Graphite and a diamond solvent/catalyst which may be a transition metal such as cobalt, nickel, iron or manganese or a non-metallic solvent/catalyst such as a carbonate or sulphate to produce a sintered, intergrown polycrystalline diamond grit. In producing the grit, the graphite is converted to diamond.
3. A combination of 1 and 2.
4. Diamond and a carbide forming metal such as silicon or titanium to produce a grit which is a sintered polycrystalline diamond/ SiC or TiC composite.
5. A combination of 1 and 4 or 2 and 4.
6. Cubic boron nitride together with a boride or nitride forming metal such as aluminium, titanium, zirconium, hafnium, tantalum, molybdenum, niobium, chromium or tungsten or mixtures thereof introduced either in metallic form or as a substoichiometric or stoichiometric carbide, boride or nitride. The polycrystalline cubic boron nitride grit produced consists of cubic boron nitride and metal nitrides or borides.
7. A combination of 6 and cobalt, nickel, iron or manganese.
8. A combination of cubic boron nitride and alumina or a combination of diamond and alumina.
9. Hexagonal boron nitride and a suitable solvent/catalyst for cubic boron nitride such as magnesium, lithium or calcium in either metallic form, as a nitride or in the form of a boronitride to produce a sintered, intergrown polycrystalline cubic boron nitride grit. In producing the grit, the hexagonal boron nitride is converted to cubic boron nitride.

The green state granules are placed in the reaction zone of a standard high pressure/high temperature apparatus for the high pressure/high temperature sintering. Generally, the granules will be placed in a capsule which itself is placed in the reaction zone.

A separating medium separates individual granules in the reaction zone. The separating medium is preferably provided as a coating on individual granules. A particularly suitable method of coating individual granules is spray coating in a fluidised medium.

The separating medium, in one form of the invention, may be a metal or alloy which does not interfere with the high pressure/high temperature sintering of the green state granules. For example, molybdenum is a suitable coating where the ultra-hard abrasive is diamond or a precursor for diamond, e.g. graphite.

The separating medium may also be an inert medium which adequately transmits pressure, e.g. a salt such as a chloride or a carbonate, graphite, hexagonal boron nitride or an oxide.

A chemical barrier layer may be applied to the green state granules, generally to coat the granules completely, prior to the separation medium being interposed between adjacent granules. Examples of suitable chemical barrier layers are niobium, molybdenum, tantalum, titanium or other transition metal. The chemical barrier layer may be left on the polycrystalline abrasive grit produced from the green state granules.

The separating medium and chemical barrier layers may be applied to the green state granules by spraying in the form of an aqueous or non-aqueous suspension. The granules will generally be in a fluidised state during spraying. Alternatively, the granules may be dipped into a suspension of the separation medium and/or chemical barrier layer, or these layers may be coated mechanically on to the granules.

In one particular form of the invention, the green state granules are placed in a container, the separating medium in powdered or liquid form poured into the container and the granules and the separating medium mixed. If necessary, good dispersion and mixing can be assisted by some mechanical agitation or vibration to ensure that there are no gaps and the green state granules are all embedded in or enclosed by the separating medium.

Before subjecting the green state granules to the elevated temperature and pressure sintering, any removable binder, e.g. an organic binder which is present is preferably removed, for example, by a pressureless heat treatment.

The heat treatment conditions will vary according to the nature of the granules and its content. Typical heat treatment or outgassing conditions are 500° C. in an argon atmosphere or 400° C. in air or 1100° C. in a vacuum. A slow heating cycle is preferred.

The green state granules may optionally be densified. Densification can be achieved by uniaxial compaction or cold isostatic pressing. Some deformation of the granules will take place during this compaction. When the green state granules contain a binder which is removed, the densification may take place before or after the binder is removed.

The elevated temperature and pressure sintering conditions to which the green state granules are subjected are known in the art. Typical pressures are 3 to 9 GPa and typical temperatures are 1000 to 2500° C.

The sintered material is removed from the reaction zone of the high temperature/high pressure apparatus using known techniques. The material which is recovered is sintered and coherent and consists of a plurality of sintered granules separated by the separating medium and a chemical barrier layer, when provided. The individual sintered granules or polycrystalline ultra-hard abrasive grit can be released by removing the separating medium. For example, if the separating medium is a metal such as molybdenum, the material may be placed in a hot boiling acid such as 3 parts of boiling hydrofluoric acid and one part nitric acid. This will dissolve the molybdenum leaving a plurality of polycrystalline diamond grit. When the separating medium is hexagonal boron nitride, removal of the separating medium may be achieved by placing the sintered material in an ultrasonic bath filled with water. Hexagonal boron nitride is hydrolysed by the water and the sonification breaks up or disintegrates the hexagonal boron nitride.

The polycrystalline ultra-hard abrasive grit produced by the method of the invention will typically have a particle size less than 5 mm and typically less than 2 mm. This grit may be used in a variety of abrasive applications, depending on the content and composition of the grit. The polycrystalline nature of the grit provides for a better bond retention in the bonding matrix of an abrasive tool when compared with single crystal grit. Further, controlled fracture of the grit can occur resulting in sharp edges or points being continuously produced, in use. The invention provides a particularly effective and economic method of producing polycrystalline abrasive grit. Further, the method is versatile in that polycrystalline abrasive grit may be produced with or without a second (binder) phase and contain more than one type of ultra-abrasive. The method allows for the production of polycrystalline abrasive grit of controlled shape and size.

EXAMPLE 1

A solvent based suspension with a 80 weight percent diamond (average particle diameter approximately 10 microns) and 20 weight percent of submicron cobalt powder was prepared and approximately 1 volume percent of organic binder added. The suspension was processed using a combination of spray drying and fluidised bed technology to produce strong green state spherical granules of approximately 1 mm diameter and a porosity of approximately 42%. A solvent based suspension was formulated using submicron molybdenum powder. The diamond/cobalt granules were fluidised and a thin layer of molybdenum of approximately 100 microns thickness was spray dried on to the granules, using the molybdenum suspension.

The coated green state granules were placed into a die set and uniaxially compacted to yield a green compact of approximately 60% density. Binder removal from the green state granules was achieved by heat treatment at 1100° C. for 2 hours in vacuum. The outgassed green state granules were then loaded into a metal canister. The canister was loaded into the reaction capsule of a standard high pressure/high temperature apparatus and the loaded capsule placed into the reaction centre of this apparatus. The contents of the canister were exposed to a temperature of approximately 1450° C. and a pressure of 5 GPa. These conditions were maintained for 10 minutes. After completion of the treatment a densely sintered compact was recovered from the canister. A polished cross-section showed sintered polycrystalline diamond grit separated by a honeycomb structure of thin molybdenum veins. The compact was placed into a beaker with 3 parts of boiling hydrofluoric acid and 1 part nitric acid. After a few minutes of treatment the compact separated into a plurality of roundish particles of approximately 0,5 to 0,7 mm diameter. Closer examination showed these particles to consist of hard sintered polycrystalline diamond with the cobalt leached out of the surface region of the particles.

EXAMPLE 2

An organic suspension of hexagonal boron nitride containing a small amount of dissolved organic binder was prepared. The molybdenum clad green state granules described in Example 1 were fluidised and spray coated with a second approximately 100 micron thick coating of hexagonal boron nitride, using the hexagonal boron nitride suspension. Repeating the same compaction, outgassing and high temperature/high pressure treatment as described in Example 1 resulted in a coherent sintered compact recovered from the canister. The compact was placed into an ultrasonic bath filled with water. After a few minutes of sonification the compact separated into a plurality of roundish particles of approximately 0,6 to 0,8 mm diameter. Closer examination revealed the particles to consist of sintered polycrystalline diamond grit clad with a thin sintered molybdenum metal coating.

EXAMPLE 3

The procedure in Example 2 was repeated replacing the hexagonal boron nitride layer with a spray deposited sodium chloride layer. The binder removal temperature was lowered to 500° C. in argon so as to prevent volatilisation of the chloride. Repeating the same compaction, outgassing and high temperature/high pressure treatment as described in Example 1 resulted in a coherent sintered compact recovered from the canister. The compact was placed into an ultrasonic bath filled with water. After a few minutes of sonification the compact separated into a plurality of roundish particles of approximately 0,6 to 0,8 mm diameter. Closer examination revealed the particles to consist of sintered polycrystalline diamond grit clad with a thin sintered molybdenum metal coating.

What is claimed is:

1. A method of producing a plurality of polycrystalline ultra-hard abrasive grit, which comprises:

providing a mass of ultra-hard abrasive particles or a mass of combination of a precursor for such particles and a suitable solvent/catalyst, fanning the mass into a plurality of green state granules, placing the granules with a separating medium between adjacent granules in the reaction zone of a high pressure/high temperature apparatus, subjecting the contents of the reaction zone to elevated temperature and pressure conditions at which the ultra-hard abrasive particle is crystallographically stable, recovering the thus sintered material from the reaction zone and removing the separating medium in the sintered material to produce a plurality of polycrystalline abrasive grit.

2. A method according to claim 1 wherein the green state granules are produced by granulation or pelletising.

3. A method according to claim 1, wherein the green state granules contain a second phase which is an organic or inorganic binder, such binder being removed prior to subjecting the granules to the high temperature/high pressure conditions.

4. A method according to claim 1, wherein the green state granules contain a second phase which participates in or contributes to the formation of the polycrystalline ultra-hard abrasive grit.

5. A method according to claim 4 wherein the second phase is a solvent/catalyst for the ultra-hard abrasive.

6. A method according to claim 1, wherein the green state granules contain diamond and a metal solvent/catalyst.

7. A method according to claim 1, wherein the green state granules contain graphite and a diamond solvent/catalyst.

8. A method according to claim 1, wherein the green state granules contain diamond, graphite and a diamond solvent/catalyst.

9. A method according to claim 1, wherein the green state granules contain diamond and a carbide forming metal.

10. A method according to claim 1, wherein the green state granules contain diamond, a diamond solvent/catalyst and a carbide fanning metal.

11. A method according to claim 1, wherein the green state granules contain cubic boron nitride and a boride or nitride forming metal.

12. A method according to claim 1, wherein the green state granules contain a combination of cubic boron nitride, a boride or nitride forming metal, and a metal selected from cobalt, nickel, iron and manganese.

13. A method according to claim 1, wherein the green state granules contain cubic boron nitride and alumina.

14. A method according to claim 1, wherein the green state granules contain diamond and alumina.

15. A method according to claim 1, wherein the green state granules contain hexagonal boron nitride and a sol-ventlcatalyst for cubic boron nitride.

16. A method according to claim 1, wherein the separating medium is provided as a coating on individual granules.

17. A method according to claim 1, wherein the ultra-hard abrasive for the green state granules is diamond or a precursor for diamond, and the separating medium is molybdenum.

18. A method according to claim 1, wherein the separating medium is selected from a salt, graphite, hexagonal boron nitride and an oxide.

19. A method according to claim 1, wherein a chemical barrier layer is applied to the green state granules prior to the separation medium being interposed between adjacent granules.

20. A method according to claim 19 wherein the chemical barrier layer coats the granules completely.

21. A method according to 19, wherein the chemical barrier layer is selected from niobium, molybdenum, tantalum, titanium or other transition metal.

22. A method according to claim 19, wherein the chemical barrier layer is left on the polycrystalline abrasive grit produced from the green state granules.

23. A method according to claim 1, wherein the elevated temperature conditions are a pressure in the range 3 to 9 GPa and a temperature in the range 1000 to 25000 ° C.

* * * * *